United States Patent [19]

Yuyama et al.

[11] Patent Number: 4,965,321
[45] Date of Patent: Oct. 23, 1990

[54] THERMOPLASTIC COPOLYMER

[75] Inventors: Masahiro Yuyama; Teruhisa Koyama; Hideaki Matsurra; Shinji Date, all of Niihama, Japan

[73] Assignee: Sumitomo Chemical Co., Ltd., Osaka, Japan

[21] Appl. No.: 225,289

[22] Filed: Jul. 28, 1988

[30] Foreign Application Priority Data

Jul. 30, 1987 [JP] Japan .................................. 62-191941
Mar. 24, 1988 [JP] Japan .................................. 63-071465

[51] Int. Cl.$^5$ ........................................... Q08F 220/02
[52] U.S. Cl. ................................. 525/329.7; 525/330.2
[58] Field of Search ................. 525/329.7, 329.2, 330.2

[56] References Cited

U.S. PATENT DOCUMENTS 3,137,660  6/1964  Jones ..................................... 260/2.2
4,789,709 12/1988  Kato et al. ......................... 525/330.2

FOREIGN PATENT DOCUMENTS 0264508  4/1988  European Pat. Off. .
0273397  7/1988  European Pat. Off. .
1437176  5/1976  United Kingdom .
EP76691   1/1983  United Kingdom ............. 525/329.7

OTHER PUBLICATIONS

Chemical Abstracts 100:15756w (1984), European Search Report 88 30 6290.
Chemical Abstracts 104:34525f (1986), European Search Report 88 30 6290.
An English abstract WPI Acc No. 84-026819/05 which is an abstract of Japanese Patent First Publication (Kokai) No. 217501/1983.
An English abstract WPI Acc No. 85-149205/25 which is an abstract of Japanese Patent First Publication (Kokai) No. 81239/1985.
An English abstract WPI Acc No. 87-174774/25 which is an abstract of Japanese Patent First Publication (Kokai) No. 106946/1987.

*Primary Examiner*—Joseph L. Schofer
*Assistant Examiner*—Alex H. Walker
*Attorney, Agent, or Firm*—Birch, Stewart, Kolasch and Birch

[57] ABSTRACT

A thermoplastic copolymer which comprises (a) 2.0 to 22.0% by weight of a methyl methacrylate unit, (b) 38.0 to 70.0% by weight of a styrene unit, and 20.0 to 45.0% by weight in total of both (c) a methacrylic acid unit and (d) an acid anhydride unit having a 6-membered ring structures. The acid anhydride unit has a 6-membered ring structure being in an amount of not less than 16.0% by weight per total amount of the units (c) and (d), and the copolymer has a reduced viscosity of 0.3 to 1.5 dl/g (measured in a 1% solution in dimethylformamide at 25° C. which has well balanced heat distortion resisting properties, water absorption properties and mechanical strength and excellent heat stability in the fabrication thereof, and is useful for producing various parts such as automobile parts, electrical parts, industrial parts and miscellaneous goods.

9 Claims, No Drawings

THERMOPLASTIC COPOLYMER

This invention relates to a thermoplastic copolymer having excellent heat distortion resisting properties, and more particularly, to a thermoplastic copolymer which is glass clear and shows excellent heat stability in the fabrication thereof and has well balanced heat distortion resisting properties, water absorption properties and mechanical properties, and a process for the production thereof.

PRIOR ART

Copolymers such as polymethyl methacrylate, polystyrene or methyl methacrylate-styrene copolymer have excellent characteristics such as excellent transparency, mechanical properties and processability and hence have widely been used in various fields such as automobile parts, electrical parts, industrial parts, miscellaneous goods, and the like.

However, with the expansion of the utilities of these resins, it is required to obtain resin materials having more improved properties such as a high, heat distortion temperature, a low degree of water absorption and excellent mechanical properties and further excellent transparency. In order to obtain the desired copolymer having these improved properties, there have been proposed various techniques, for instance, British Patent No. 1,437,176 discloses a thermoplastic copolymer of a mono-substituted acrylic acid or anhydride thereof with an alkyl methacrylate or styrene; and Japanese Patent First Publication (Kokai) No. 217501/1983 discloses a copolymer of a methyl methacrylate, an acrylic ester or aromatic vinyl compound, acrylic acid or methacrylic acid, and a 6-membered cyclic acid anhydride. These copolymers have improved heat distortion resisting properties but the improvement is still unsatisfactory, and further the copolymers are unsatisfactory in the lowering of the degree of water absorption.

Although Japanese Patent First Publication (Kokai) No. 81239/1985 discloses a thermoplastic resin composition comprising a polymer having a ring structure of glutaric acid anhydride and a polymer of a vinyl monomer, the invention aims at the improvement of the heat resistance of the latter polymer by incorporating the former polymer having improved heat resistance due to the ring structure of glutaric acid anhydride, and hence, the composition is still unsatisfactory in the improvment of the heat resistance and in the balance of the heat distortion resisting properties, water absorption properties, strength and transparency.

Japanese Patent First Publication (Kokai) No. 43642/1986 discloses a thermoplastic resin composition comprising a copolymer resin of methacrylic acid and styrene and polymethyl methacrylate, but this composition is also unsatisfactory in the balance of properties as a resin material.

Thus, there has never been known a resin material having excellent heat distortion resisting properties, water absorption properties, strength and transparency and being well balanced in these properties.

SUMMARY OF THE INVENTION

The present inventors have intensively studied the improvement of properties of resin materials as mentioned above and have found the certain thermoplastic resin having these excellent properties, particularly excellent transparency and heat resistance and further heat stability in the fabric thereof, can be obtained from specific amounts of the monomers of methyl methacrylate, styrene and methacrylic acid, and an acid anhydride having a 6-membered ring structure which is derived from the monomers.

An object of the invention is to provide a thermoplastic polymer having excellent heat distortion resisting properties and well balanced properties in heat resistance, water absorption properties, strength and transparency. Another object of the invention is to provide a thermoplastic resin composition having well balanced properties suitable as a resin material for producing various parts such as automobile parts, electrical parts, industrial parts, miscellaneous goods, etc. A further object of the invention is to provide a process for the production of the thermoplastic copolymer as set forth above. These and other objects and advantages of the invention will be apparent to those skilled in the art from the following description.

DETAILED DESCRIPTION OF THE INVENTION

The thermoplastic copolymer of this invention comprises (a) 2.0 to 22.0% by weight, preferably 6.0 to 22.0% by weight, of a methyl methacrylate unit, (b) 38.0 to 70.0% by weight, preferably 40.0 to 65.0% by weight, of a styrene unit, and 20.0 to 45.0% by weight, preferably 25.0 to 43.0% by weight, in total of both (c) a methacrylic acid unit and (d) an acid anhydride unit having a 6-membered ring structure of the formula:

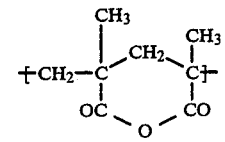

The acid anhydride unit has a 6-membered ring structure being in an amount of not less than 16.0% by weight, preferably not less than 20.0% by weight, per total amount of the units (c) and (d), and the copolymer has a reduced viscosity of 0.3 to 1.5 dl/g, preferably 0.5 to 1.0 dl/g (measured in a 1% solution in dimethylformamide at 25° C.).

When the amount of (a) methyl methacrylate unit in the copolymer is less than 2.0% by weight, the copolymer shows lower strength, and on the other hand, when the amount thereof is larger than 22.0% by weight, the copolymer shows undesirably insufficient heat distortion resisting properties and less transparency.

When the amount of (b) styrene unit is less than 38.0% by weight, the copolymer shows a higher degree of water absorption and less transparency, and on the other hand, when the amount thereof is larger than 70.0% by weight, the copolymer shows lower transparency and mechanical properties, particularly lower tensile strength and further inferior heat distortion resisting properties.

When the total amount of (c) methacrylic acid unit and (d) acid anhydride unit having a 6-membered ring structure is less than 20.0% by weight, the copolymer shows insufficient improvement in heat distortion resisting properties. When the amount of (d) unit per total amount of the units (c) and (d) is less than 16.0% by weight, the copolymer shows a high degree of water absorption, and when it is processed, there is produced a molded product having an inferior appearance such as the occurrence of splay marks.

The copolymer of this invention is used for fabrication and hence has to have an appropriate molecular weight. The molecular weight may be defined by a reduced viscosity which is preferably in the range of 0.3 to 1.5 dl/g, preferably 0.5 to 1.0 dl/g. When the copolymer has a reduced viscosity of less than 0.3 dl/g, it has reduced mechanical properties, and on the other hand, when the reduced viscosity thereof is larger than 1.5 dl/g, the copolymer shows lower flowability and hence lower processability.

The copolymer of this invention can be produced by copolymerizing (a) methyl methacrylate, (b) styrene, and (c) methacrylic acid in the presence of a radical polymerization initiator (e.g. lauroyl peroxide, di-tert-butyl peroxide, etc.) and a chain transfer agent (e.g. tert-dodecylmercaptan, etc.) by a known polymerization method such as suspension polymerization, bulk polymerization, emulsion polymerization, solution polymerization, and the like, followed by subjecting the resulting basic copolymer to a cyclization reaction to produce an acid anhydride unit having a 6-membered ring structure of methacryclic acids.

The cyclization reaction can be carried out by heating at a temperature of 150° to 350° C. as disclosed in British Patent No. 1,437,176 and Japanese Patent First Publication (Kokai) No. 217501/1983. In order to conduct the reaction effectively, it may be carried out by adding a basic compound (e.g. sodium hydroxide, etc.) as disclosed in Japanese Patent First Publication (Kokai) No. 254608/1986 or a cyclization accelerator such as organic carboxylic acid salts (e.g. sodium acetate, etc.) and/or carbonates (e.g. sodium carbonate, etc.) as disclosed in Japanese Patent First Publication (Kokai) No. 261303/1986.

In the production of the basic copolymer as mentioned hereinbefore, the charging ratio of methyl methacrylate to styrene is increased from the ratio of these component units in the copolymer while taking into consideration the decrease due to consumption in the cyclization reaction.

The reduced viscosity of the copolymer may be controlled in accordance with the amount of the chain transfer agent used in the production of basic copolymer. When the chain transfer agent is used in a larger amount, the copolymer shows a smaller reduced viscosity, and when it is used in a smaller amount, the copolymer shows a larger reduced viscosity. Thus, the chain transfer agent is usually used in an amount of 0.05 to 1.0% by weight based on the whole weight of the monomers.

When the thermoplastic copolymer of this invention is used as a resin material for the production of various parts such as automobile parts, electrical parts, industrial parts, miscellaneous goods, it can be used as it stands but is preferably used in the form of a resin composition by mixing with conventional additives, such as antioxidants, ultraviolet absorbents, coloring agents, antistatic agents, flame retardants, lubricants, and the like.

It may also be incorporated with inorganic fillers, such as calcium carbonate, talc, glass fiber, and the like, unless they affect the desired properties of the copolymer of this invention.

A thermoplastic resin composition having excellent properties of the copolymer of this invention may also be produced by mixing the copolymer of this invention with other transparent resins, such as conventional methyl methacrylate resin, polyvinyl chloride, polystyrene, polycarbonate, acrylonitrile-styrene copolymer resin, styrene-methyl methacrylate copolymer resin, and the like.

The thermoplastic copolymer of this invention has a heat distortion resisting property of not lower than 130° C., a light transmittance of not less than 80%. In addition to such excellent heat distortion resisting properties and transparency, the copolymer also has a low degree of water absorption and high mechanical strength, and these properties are well balanced. In view of these excellent properties, the copolymer of this invention can be used in various utilities, for example, automobile parts such as lamp covers, inner lens, meter covers; name plates; elecrical and acoustic parts such as lamp shades, cassette cases; optical parts; heat-resistant film; and the like.

This invention is illustrated by the following Examples but should not be construed to be limited thereto. In the Examples, the properties of the copolymer were evaluated by the following methods.

(1) Analysis of compositions of the copolymer:

The amount of acid anhydride having the 6-membered ring structure was measured by absorbance at 1760 $cm^{-1}$ which is peculiar to the structure of acid anhydride with an infrared spectrometer.

The amount of methacrylic acid was measured by neutralization titration.

The amounts of styrene and methyl methacrylate were calculated based on the charging amount thereof.

(2) Reduced viscosity:

It was measured by the method described in JIS Z8803 using Ostwald's viscometer (#50) in a 1% by weight solution in dimethylformamide at 25° C.

(3) Properties of molded product:

(i) Preparation of test samples:

A copolymer in the pellet form was injection-molded under an injection pressure of 80 kd/$cm^2$ at a resin temperature of 260° C. with an injection molding machine (M140-SJ, manufactured by Meiki Co., Ltd., Japan).

(ii) Heat distortion temperature (HDT):

The test samples were annealed for 12 hours, and the HDT thereof was measured by giving a fiber stress of 18.6 kg/$cm^2$ by the same method as described in ASTM D-648.

(iii) Water absorption property:

The test samples were dipped in water at room temperature for 50 days, and thereafter the increased weight was divided by the original weight of the test sample. The obtained value is shown as the degree of water absorption (%).

(iv) Mechanical strength:

A tensile shear strength (kg/$cm^2$) was measured by the same method as described in ASTM D-638.

(v) Light transmittance (%):

It was measured by the same method as described in ASTM D-1003 with an integrating sphere hazemeter, wherein the test samples had a thickness of 3 mm.

(vi) Appearance of the molded product:

Test samples (15 cm×15 cm×3 mm) produced by injection molding were observed with naked eyes.

EXAMPLES 1 TO 15 AND COMPARATIVE EXAMPLES 1 TO 9

A 5 liter autoclave provided with an agitator is charged with pure water (2.0 liter) and hydroxyethyl cellulose (1.0 g) and to the solution are added a fixed amount of monomers as shown in Table 1, tert.-dodecylmercaptan (3.9 g), lauroyl peroxide (6.5 g), 1,1'-azobis(cyclohexyl-1-carbonitrile) (2.6 g), and the mixture is polymerized with agitating at 80° C. for 4 hours and further at 100° C. for one hour. The reaction mixture is washed, dehydrated and dried to give a bead polymer.

The bead polymer thus obtained (100 parts by weight) is mixed with sodium hydroxide (0.02 part by weight) in Henschel mixer and the mixture is granulated with a 400 mm$\phi$ vented extruder (type VS40-28, manufactured by Tanabe Plastics Machinery Co., Ltd., Japan) at a screw revolution speed of 50 r.p.m. and at a resin temperature of 290° C. to give pellets.

The compositions and reduced viscosity of the pellets and properties of the injection-molded product were measured and the results are shown in Table 1.

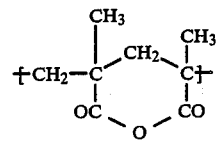

said acid anhydride unit having a 6-membered ring structure being in an amount of not less than 16.0% by weight per total amount of the units (c) and (d), and said copolymer having a reduced viscosity of 0.3 to 1.5 dl/g (measured in a 1% solution in dimethylformamide at 25° C.).

2. The thermoplastic copolymer according to claim 1, which comprises (a) 6.0 to 22.0% by weight of the methyl methacrylate unit, (b) 40.0 to 65.0% by weight of the styrene unit, and 25.0 to 43.0% by weight in total of both (c) the methacrylic acid unit and (d) the acid anhydride unit having a 6-membered ring structure, said acid anhydride unit having a 6-membered ring structure being in an amount of not less than 20.0% by weight per total amount of the units (c) and (d), and said copolymer having a reduced viscosity of 0.5 to 1.0 dl/g (measured in a 1% solution in dimethylformaide at 25° C.).

3. The thermoplastic copolymer according to claim 1, which comprises (a) 6.0 to 22.0% by weight of the methacrylate unit.

TABLE 1

| Ex. No. | Amount of charged monomers (g) *1 | | | Composition of copolymer (wt. %) *1 | | | | Reduced viscosity | Properties of molded product | | | | Appearance *2 |
|---|---|---|---|---|---|---|---|---|---|---|---|---|---|
| | MMA | MAA | Styrene | MMA | MAA | Acid anhydride | Styrene | | HDT | Water absorp. degree | tensile strength | Light transmittance | |
| Ex. 1 | 390 | 390 | 520 | 20.5 | 21.9 | 16.2 | 41.4 | 0.67 | 138 | 3.2 | 650 | 82 | o |
| Ex. 2 | 390 | 195 | 715 | 19.6 | 0.6 | 22.4 | 57.3 | 1.26 | 129 | 1.3 | 630 | 84 | o |
| Ex. 3 | 260 | 520 | 520 | 16.9 | 24.0 | 18.0 | 41.1 | 0.77 | 147 | 3.3 | 700 | 85 | o |
| Ex. 4 | 325 | 390 | 585 | 16.8 | 23.1 | 13.8 | 46.3 | 0.69 | 137 | 3.0 | 660 | 83 | o |
| Ex. 5 | 325 | 325 | 650 | 16.9 | 18.1 | 13.6 | 51.5 | 0.51 | 135 | 1.8 | 640 | 86 | o |
| Ex. 6 | 260 | 390 | 650 | 11.6 | 23.1 | 13.8 | 51.4 | 0.52 | 138 | 2.6 | 660 | 86 | o |
| Ex. 7 | 260 | 325 | 715 | 12.8 | 19.0 | 11.9 | 56.3 | 0.44 | 134 | 1.8 | 640 | 87 | o |
| Ex. 8 | 260 | 260 | 780 | 14.9 | 15.7 | 8.4 | 61.0 | 0.42 | 131 | 1.2 | 680 | 85 | o |
| Ex. 9 | 195 | 520 | 585 | 9.4 | 29.2 | 15.2 | 46.2 | 0.75 | 153 | 5.2 | 660 | 83 | o |
| Ex. 10 | 195 | 455 | 650 | 6.9 | 28.7 | 13.1 | 51.3 | 0.58 | 142 | 3.8 | 650 | 83 | o |
| Ex. 11 | 195 | 390 | 715 | 8.2 | 24.5 | 11.0 | 56.3 | 0.46 | 138 | 2.6 | 640 | 85 | o |
| Ex. 12 | 130 | 520 | 650 | 5.3 | 36.4 | 7.5 | 50.8 | 0.62 | 146 | 4.6 | 620 | 83 | o |
| Ex. 13 | 130 | 390 | 780 | 5.1 | 26.1 | 7.7 | 61.1 | 0.39 | 139 | 2.5 | 610 | 87 | o |
| Ex. 14 | 130 | 325 | 845 | 3.9 | 9.3 | 19.7 | 67.1 | 0.54 | 133 | 1.1 | 610 | 88 | o |
| Ex. 15 | 65 | 520 | 715 | 3.4 | 27.5 | 13.1 | 56.0 | 0.80 | 156 | 4.2 | 620 | 84 | o |
| Comp. Ex. 1 | 650 | 390 | 260 | 46.8 | 4.4 | 15.8 | 33.0 | 0.79 | 125 | 5.3 | 660 | 64 | o |
| Comp. Ex. 2 | 455 | 390 | 455 | 24.0 | 20.5 | 19.1 | 36.4 | 0.81 | 139 | 3.2 | 680 | 73 | o |
| Comp. Ex. 3 | 455 | 195 | 650 | 31.2 | 11.5 | 6.6 | 50.7 | 0.72 | 114 | 1.1 | 630 | 85 | o |
| Comp. Ex. 4 | 325 | 520 | 455 | 19.3 | 28.4 | 16.3 | 36.0 | 0.82 | 152 | 6.8 | 419 | 68 | x |
| Comp. Ex. 5 | 260 | 585 | 455 | 9.2 | 36.7 | 17.8 | 36.3 | 0.83 | 150 | 10.5 | 670 | 79 | x |
| Comp. Ex. 6 | 260 | 130 | 910 | 18.2 | 8.4 | 3.0 | 70.4 | 0.51 | 109 | 0.6 | 490 | 83 | o |
| Comp. Ex. 7 | 65 | 585 | 650 | 1.2 | 42.3 | 5.9 | 50.6 | 0.74 | 151 | 10.1 | 580 | 71 | x |
| Comp. Ex. 8 | 65 | 260 | 975 | 5.1 | 5.9 | 12.9 | 76.1 | 0.48 | 118 | 0.7 | 308 | 81 | o |
| Comp. Ex. 9 | 0 | 520 | 780 | 0 | 25.9 | 13.1 | 61.0 | 0.72 | 147 | 3.6 | 460 | 85 | o |
| Ref. 1 | — | | | PS | | | | — | 100 | 0.1 | 450 | 89 | o |
| Ref. 2 | — | | | PMMA | | | | — | 106 | 1.6 | 740 | 93 | o |

*1 MMA: methyl methacrylate, MAA: methacrylic acid, Acid anhydride: acid anhydride having 6-membered ring obtained from methacrylic acid, PS: Polystyrene resin (ESBRITE ® GP8, supplied by Sumitomo Chemical Co., Ltd.), PMMA: Polymethyl methacrylate resin (Sumipex ® B MHO, manufactured by Sumitomo Chemical Co., Ltd.)
*2 o: Complete molded product, x: Molded product having pulled surface due to gelatin

What is claimed is:

1. A thermoplastic copolymer which comprises (a) 2.0 to 22.0% by weight of a methyl methacrylate unit, (b) 38.0 to 70.0% by weight of a styrene unit, and 20.0 to 45.0% by weight in total of both (c) a methacrylic acid unit and (d) an acid anhydride unit having a 6-membered ring structure of the formula:

4. The thermoplastic copolymer according to claim 1, which comprises (b) 40.0 to 65.0% by weight of the styrene unit.

5. The thermoplastic copolymer according to claim 1, which comprises 25.0 to 43.0% by weight in total of both (c) the methacrylic acid unit and (d) the acid anhydride unit having a 6-membered ring structure.

6. The thermoplastic copolymer according to claim 1, wherein said acid anhydride unit having a 6-membered ring structure is present in an amount of not less than 20.0% by weight per total amount of units (c) and (d).

7. The thermoplastic copolymer according to claim 1, further comprising additives selected from the group consisting of antioxidants, ultraviolet absorbents, coloring agents, antistatic agents, flame retardants, and lubricants.

8. The thermoplastic copolymer according to claim 1, further comprising inorganic fillers selected from the group consisting of calcium carbonate, talc, and glass fiber.

9. The thermoplastic copolymer according to claim 1, further comprising transparent resins selected from the group consisting of methyl methacrylate resin, polyvinyl chloride, polystyrene, polycarbonate, acrylonitrile-styrene copolymer resin, and styrenemethyl methacrylate copolymer resin.

* * * * *